(12) United States Patent
Holzapfel et al.

(10) Patent No.: US 11,201,474 B2
(45) Date of Patent: Dec. 14, 2021

(54) ARRANGEMENT FOR FEEDING ELECTRICAL POWER INTO AN AC GRID

(71) Applicant: Siemens Aktiengesellschaft, Munich (DE)

(72) Inventors: Johann Holzapfel, Staatz-Kautendorf (AT); Alexander Rentschler, Bensheim (DE); Christian Wallner, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/086,617

(22) Filed: Nov. 2, 2020

(65) Prior Publication Data

US 2021/0135457 A1    May 6, 2021

(30) Foreign Application Priority Data

Oct. 31, 2019 (EP) .................................... 19206627

(51) Int. Cl.
*H02J 3/38* (2006.01)
*H02J 7/00* (2006.01)

(52) U.S. Cl.
CPC ............ *H02J 3/381* (2013.01); *H02J 7/0014* (2013.01); *H02J 2300/24* (2020.01); *H02J 2300/28* (2020.01)

(58) Field of Classification Search
CPC ...... H02J 3/381; H02J 7/0014; H02J 2300/28; H02J 2300/24; H02J 7/00; H02J 3/38
See application file for complete search history.

(56) References Cited

U.S. PATENT DOCUMENTS 6,293,828 B1    9/2001 Colver et al.
2015/0270801 A1    9/2015 Kessler et al.

FOREIGN PATENT DOCUMENTS

| CN | 109921448 A | 6/2019 |
| EP | 3487026 A1 | 5/2019 |
| KR | 20180121431 A | 11/2018 |
| WO | 2014181081 A1 | 11/2014 |

*Primary Examiner* — Robert L Deberadinis
(74) *Attorney, Agent, or Firm* — Laurence A. Greenberg; Werner H. Stemer; Ralph E. Locher

(57) ABSTRACT

An arrangement for feeding electrical power into an AC grid includes a multiplicity of feed modules. Each feed module includes a converter module for converting a direct voltage into an alternating voltage, as well as a storage module for storing electrical energy. The storage module is connected to a direct voltage side of the converter module and an alternating voltage side of the converter module is configured for connection to the AC grid and/or to at least a further one of the feed modules, so that on the alternating voltage side the feed modules form a series circuit that can be connected to the AC grid. At least one of the storage modules is configured for connection to an energy generation plant.

16 Claims, 1 Drawing Sheet

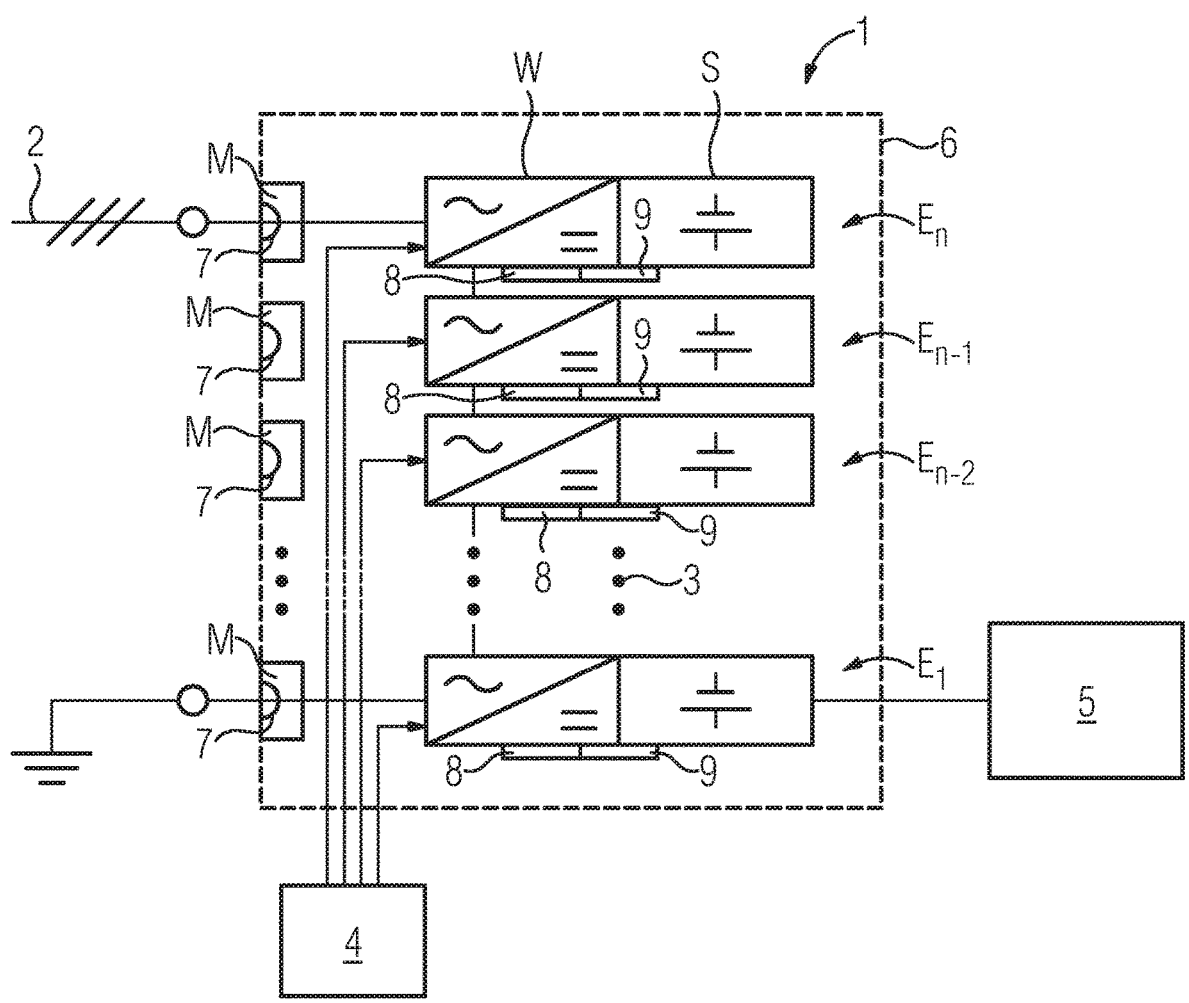

ARRANGEMENT FOR FEEDING ELECTRICAL POWER INTO AN AC GRID

CROSS-REFERENCE TO RELATED APPLICATION

This application claims the priority, under 35 U.S.C. § 119, of European Patent Application EP 19 206 627, filed Oct. 31, 2019; the prior application is herewith incorporated by reference in its entirety.

BACKGROUND OF THE INVENTION

Field of the Invention

The invention relates to an arrangement for feeding electrical power into an AC grid.

The generation of energy from renewable energy sources presents a challenge in terms of the volatility of the generation and the quality of transmission. Both the feeding and the storage of the generated energy call for new solutions for the existing infrastructure of the AC grids.

A generic arrangement is known from the prior art that converts a direct voltage provided by an energy generation plant into an alternating voltage by using a power converter, and feeds it into a connected AC grid. That type of energy feed is, however, not appropriate for the challenges presented by the volatility of the energy generation.

Arrangements for the (intermediate) storage of electrical energy that can be connected to an AC grid are, furthermore, known. A converter arrangement with a converter and a storage arrangement is known from European Patent Application EP 3 487 026 A1. The converter can be connected to the AC grid at its alternating voltage side. The storage arrangement is connected to the direct voltage side of the converter. The known converter arrangement is suitable for a particularly effective grid stabilization through the exchange of real and reactive power with the AC grid.

BRIEF SUMMARY OF THE INVENTION

It is accordingly an object of the invention to provide an arrangement for feeding electrical power into an AC grid, which overcomes the hereinafore-mentioned disadvantages of the heretofore-known arrangements of this general type and which enables an energy feed that is as reliable as possible and meets the requirements of energy generation, in particular from renewable energy sources.

With the foregoing and other objects in view there is provided, in accordance with the invention, an arrangement for feeding electrical power into an AC grid, comprising a multiplicity of feed modules, wherein each feed module includes a converter module for converting an (input side) direct voltage into an (output side) alternating voltage, as well as a storage module for storing electrical energy, the storage module is connected to a direct voltage side of the converter module and an alternating voltage side of the converter module is configured for connecting to the AC grid and/or to at least a further one of the feed modules (expediently an adjacent one in the resulting series circuit), so that on the alternating voltage side the feed modules form a series circuit that can be connected to the AC grid (connected to the AC grid when the arrangement is in operation), and at least one of the storage modules is configured for connecting to an energy generation plant.

An arrangement is accordingly proposed with the present invention that enables both direct feed of generated energy as well as its storage. Through the integration of the functionalities of conversion and storage in the arrangement of cascaded feed modules, the operating measures required can be reduced, a point that also applies to losses entailed in operation. The energy generated by using the energy generation plant is fed into at least one of the storage modules; the energy stored there can be fed by using at least one of the converter modules into the output-side AC grid, wherein a direct voltage can be converted into an alternating voltage of the AC grid. On the output side the feed modules are connected in a series circuit, so that an output-side voltage corresponds to the sum of the voltages generated at the individual feed modules. Such a modular construction advantageously enables an adaptation to the respective operating voltage of the AC grid.

Expediently, storage modules of only some of the feed modules of the series circuit can be connected to the energy generation plant or are connected to the energy generation plant during operation of the arrangement. The arrangement is, accordingly, exclusively connected through these few selected storage modules, so that the electrical energy from the energy generation plant is transferred to these few storage modules. The energy drawn from the few storage modules can be transferred to the other storage modules by charge transfer. A cascaded arrangement of the feed or storage modules is spoken of in this connection. The charge transfer can, for example, take place cyclically, in order to achieve a uniform distribution of the charge in the storage modules. The storage modules expediently include capacitors, wherein a capacitor voltage can be generated at the capacitors through charge transfer or charge balancing. Advantageously, only the storage module of a first one of the feed modules, expediently of the feed module at the lowest potential, can be connected to the energy generation plant or connected in operation. As a result of the cascaded arrangement, or of the series circuit of feed modules, the feed modules when operating are at different potential levels. The first one, or the lowest one in the arrangement, is accordingly the one at the lowest potential, that is to say the one that lies at the lowest potential level when the arrangement is in operation. The connection of the lowest-potential storage module, or of the storage module of the feed module at the lowest potential, to the energy generation plant has the advantage that in this way the demands on the insulation capability are relatively low. The supply of energy to the feed modules themselves can also take place by cascading.

The feed modules are expediently configured for a mutual exchange of electrical energy. A uniform loading of the storage modules or, if relevant, of the cascading already described, can be achieved through charge balancing between the feed or storage modules.

Each of the feed modules preferably includes a balancing module for the exchange of electrical energy with other feed modules, wherein the balancing module includes semiconductor switches that can be switched off, and the energy exchange is carried out by controlling the semiconductor switches. The semiconductor switches, for example IGBT, IGCT or other suitable power semiconductors, can for example be interconnected with the electrical switches of the storage module in such a way that the storage can be electrically connected or bridged to an adjacent storage by using suitable switching operations.

The connection of the arrangement to the AC grid is preferably made without transformers. The arrangement, or the series circuit of the feed modules, is accordingly connected when operating directly to the AC grid, i.e. without an intermediate transformer. The adjustment of the voltage by the arrangement takes place exclusively by using the converter modules; the transformer can thereby advantageously be omitted. This advantageously simplifies the servicing of the arrangement when it is operating.

The arrangement expediently includes a supporting structure that is configured to accommodate the feed modules. The supporting structure can, for example, be constructed in the form of a tower, in which the individual feed modules are disposed above and/or next to one another. A mounting place can be provided in the supporting structure for each stabilization module. The mounting place can be fitted with appropriate terminals, so that the feed module can be inserted into the supporting structure with the establishment of the electrical contacts of the series circuit of the feed modules, or can be removed from the supporting structure with a disconnection of the contacts. The feed module is expediently inserted into the module holder in operation.

According to one form of embodiment of the invention, a module holder is assigned to each feed module in the supporting structure, wherein the module holder includes a module circuit-shorter that is configured to short-circuit the assigned feed module. The module circuit-shorter is configured to bridge the assigned feed module. In this way, the device can continue to be operated even in the event of a failure of one of the feed modules, in that the faulty feed module is bridged by using the module circuit-shorter in the series circuit of the feed modules. The module circuit-shorter can, for example, include a mechanical switch. The module circuit-shorter can be controllable, or can have an automatic release mechanism. The feed modules can advantageously be removed individually from the supporting structure.

Preferably, at least one of the feed modules can be connected to the supporting structure by using extensible contacts having touch protection, so that the feed module can be removed from the supporting structure during operation of the device. The touch protection can ensure a safe removal of the feed module. Advantageously this ensures that operation of the arrangement does not have to be interrupted even in the event of a fault in one of the feed modules.

Preferably a potential difference between adjacent feed modules of the series circuit is less than 5 kV, preferably less than 2 kV. Through the use of the series circuit, or the cascading, of the feed modules, a total voltage, which in principle is arbitrary, matched to the particular application, can be generated, without significantly increasing the insulation requirements of the arrangement.

According to one form of embodiment of the invention, each feed module includes an electronic module for data acquisition and/or data exchange of operating data of the respective feed module. Data acquisition of the operating data for example takes place by using suitable measuring devices. The operating data can be transmitted to a central data acquisition apparatus. The operating data can advantageously be used for monitoring the feed modules. The data exchange further enables the control or regulation of the voltage balancing of the arrangement.

It is deemed advantageous if the arrangement includes an energy generation plant that is connected to at least one of the storage modules, so that the energy generated by using the energy generation plant can temporarily be stored in the at least one storage module. An arrangement for the generation and feed of electrical energy is thus provided, through the use of which the variations in the energy generation can be balanced, and an (above all brief) stabilization/support of the AC grid can be achieved.

The energy generation plant is expediently a PV plant or a wind turbine. A PV plant (photovoltaic plant) is particularly suitable, since this usually delivers a direct voltage that can be converted by using the arrangement directly into the alternating voltage of the AC grid.

Other features which are considered as characteristic for the invention are set forth in the appended claims.

Although the invention is illustrated and described herein as embodied in an arrangement for feeding electrical power into an AC grid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a schematic and block diagram of an exemplary embodiment of an arrangement according to the invention.

DETAILED DESCRIPTION OF THE INVENTION

Referring now in detail to the single FIGURE of the drawing, there is seen an arrangement 1 for feeding electrical energy into an AC grid 2. The arrangement 1 includes feed modules E1 . . . En. The number of feed modules can in principle be arbitrary, which is indicated by a dotted line 3. Each feed module E1 . . . En includes a storage module S as well as a converter module W. A balancing module is integrated into the storage module S in the example illustrated. In the exemplary embodiment shown in the FIGURE, all of the feed modules E1 . . . En are of identical construction, which is not, however, in general necessary. An electronic module 8 for acquiring and exchanging operation data with a central control apparatus 4 is integrated in the illustrated example into the converter module W.

The converter modules W each have an alternating voltage side and a direct voltage side. The converter modules W are connected together on the alternating voltage side in a series circuit, and are connected to the AC grid 2. Each converter module W is connected on the direct voltage side to the assigned storage module S.

The storage module of the first, or the lowest potential, feed module E1 is connected to an energy generation plant 5 in the form of a PV plant. The electrical energy provided by the energy generation plant 5 is stored in the storage module S of the first feed module E1 (or its storage capacitor), and is distributed to the other storage modules by charge balancing. Through the use of each converter module W, the energy stored (in the form of a direct voltage) in the assigned storage module S is converted into alternating voltage and is fed into the AC grid 2.

The arrangement 1 further includes a supporting structure 6 in which the feed modules E1 . . . En are disposed during operation. A dedicated mounting place is provided in the supporting structure 6 for each of the feed modules E1 . . . En. The feed modules E1 . . . En are inserted into a module holder M provided for this purpose which includes a module circuit-shorter 7, through the use of which a faulty feed module E1 . . . En can be bridged. The module holder M further includes apparatuses such as contact protection and extensible contacts that allow the faulty feed module to be released from the supporting structure 6 without operation of the arrangement having to be interrupted.

Each of the feed modules E1 . . . En can exchange energy with the other feed modules by using a balancing module 9.

The invention claimed is:

1. An arrangement for feeding electrical power into an AC grid, the arrangement comprising:
   a multiplicity of feed modules each including a converter module for converting a direct voltage into an alternating voltage and a storage module for storing electrical energy;
   said converter modules each having a direct voltage side connected to a respective one of said storage module;
   said converter modules each having an alternating voltage side configured for connection to at least one of the AC grid or at least a further one of said feed modules, forming a series circuit on said alternating voltage side of said feed modules to be connected to the AC grid; and
   at least one of said storage modules being configured for connection to an energy generation plant.

2. The arrangement according to claim 1, wherein said storage modules of only some of said feed modules of said series circuit are configured to be connected to the energy generation plant.

3. The arrangement according to claim 1, wherein only said storage module of a first one of said feed modules of said series circuit is configured to be connected to the energy generation plant.

4. The arrangement according to claim 1, wherein said feed modules are configured for a mutual exchange of electrical energy.

5. The arrangement according to claim 4, wherein each of said feed modules includes a respective balancing module for said exchange of electrical energy with others of said feed modules, said balancing modules include semiconductor switches to be switched off, and said energy exchange is carried out by controlling said semiconductor switches.

6. The arrangement according to claim 1, wherein the arrangement is connected to the AC grid without a transformer.

7. The arrangement according to claim 1, which further comprises a supporting structure configured to accommodate said feed modules.

8. The arrangement according to claim 7, which further comprises module holders each associated with a respective one of said feed modules in said supporting structure, said module holders each including a module circuit-shorter configured to short-circuit said associated feed module.

9. The arrangement according to claim 7, wherein at least one of said feed modules is configured to be connected to said supporting structure by extensible contacts having touch protection, permitting said at least one feed module to be removed from said supporting structure during operation of the arrangement.

10. The arrangement according to claim 1, wherein said feed modules include adjacent feed modules of said series circuit having a potential difference therebetween of less than 5 kV.

11. The arrangement according to claim 10, wherein the potential difference is less than 2 kV.

12. The arrangement according to claim 1, wherein each of said feed modules includes a respective electronic module for at least one of data acquisition or data exchange of operating data of a respective feed module.

13. The arrangement according to claim 1, wherein said connection of said at least one storage module to the energy generation plant permits energy generated by the energy generation plant to be temporarily stored in said at least one storage module.

14. The arrangement according to claim 13, wherein the energy generation plant is a PV plant or a wind turbine.

15. An installation for feeding electrical power into an AC grid, the installation comprising:
   an energy generation plant; and
   an arrangement including a multiplicity of feed modules each having a converter module for converting a direct voltage into an alternating voltage and a storage module for storing electrical energy;
   said converter modules each having a direct voltage side connected to a respective one of said storage module;
   said converter modules each having an alternating voltage side configured for connection to at least one of the AC grid or at least a further one of said feed modules, forming a series circuit on said alternating voltage side of said feed modules to be connected to the AC grid; and
   at least one of said storage modules being configured for connection to said energy generation plant.

16. The installation according to claim 15, wherein said energy generation plant is a PV plant or a wind turbine.

* * * * *